United States Patent
Compton et al.

(10) Patent No.: US 11,675,513 B2
(45) Date of Patent: *Jun. 13, 2023

(54) SELECTIVELY SHEARING DATA WHEN MANIPULATING DATA DURING RECORD PROCESSING

(71) Applicant: International Business Machines Corporation, Armonk, NY (US)

(72) Inventors: Scott B. Compton, Hyde Park, NY (US); Jeffrey Richard Suarez, Tucson, AZ (US); Matthew Michael Garcia Pardini, Natick, MA (US); Christian Jacobi, West Park, NY (US); Dominik Steenken, Sindelfingen (DE); Sri Hari Kolusu, Tucson, AZ (US); Vicky Vezinaw, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,617

(22) Filed: Aug. 16, 2021

(65) Prior Publication Data
US 2023/0047349 A1 Feb. 16, 2023

(51) Int. Cl.
*G06F 3/06* (2006.01)
(52) U.S. Cl.
CPC .......... *G06F 3/0643* (2013.01); *G06F 3/0613* (2013.01); *G06F 3/0685* (2013.01)
(58) Field of Classification Search
CPC ...... G06F 3/0613; G06F 3/0643; G06F 3/064; G06F 3/0685
See application file for complete search history.

(56) References Cited

U.S. PATENT DOCUMENTS

| 7,237,242 B2 | 6/2007 | Blythe et al. |
| 11,513,704 B1 | 11/2022 | Compton et al. |

(Continued)

FOREIGN PATENT DOCUMENTS

| CN | 104142958 A | 11/2014 |
| CN | 111399777 A | 7/2020 |

OTHER PUBLICATIONS

IBM, List of IBM Patents or Patent Applications Treated as Related, dated Aug. 19, 2021, 2 pages.

(Continued)

*Primary Examiner* — Chie Yew
(74) *Attorney, Agent, or Firm* — Zilka-Kotab, P.C.

(57) ABSTRACT

A computer-implemented method, according to one embodiment, includes: storing records in an input data buffer, where each of the records include a key which is appended to payload data in the respective record. Moreover, for each of the records: shearing the key associated with the record from the payload data, normalizing the sheared key, and storing the normalized sheared key in a first target area of memory. A determination is made as to whether a size of the payload data in the record is outside a predetermine range, and in response to determining that the size of the payload data in the record is outside the predetermine range, the payload data is stored in a second target area of memory. A data locator is also appended to the normalized sheared key in the first target area of memory to form a sheared record.

20 Claims, 12 Drawing Sheets

(56) References Cited

U.S. PATENT DOCUMENTS

| | | | |
|---|---|---|---|
| 2004/0139434 A1 | 7/2004 | Blythe et al. | |
| 2012/0284317 A1 | 11/2012 | Dalton | |
| 2016/0292255 A1* | 10/2016 | Ogasawara | G06F 16/25 |
| 2017/0063992 A1 | 3/2017 | Baek et al. | |
| 2019/0205056 A1* | 7/2019 | Halstuch | G06F 16/122 |

OTHER PUBLICATIONS

Krikellas et al., "Multithreaded query execution on multicore processors," 35th International Conference on Very Large Data Bases VLDB, Aug. 2009, 13 pages.

Sohn et al., "Load Balanced Parallel Radix Sort," Proceedings of the 12th International Conference on Supercomputing, 1998, pp. 305-312.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Compton et al., U.S. Appl. No. 17/403,630, filed Aug. 16, 2021, 93 pages.

Compton et al., U.S. Appl. No. 17/443,782, filed Jul. 27, 2021, 53 pages.

Notice of Allowance from U.S. Appl. No. 17/403,630, dated Jul. 27, 2022.

Corrected Notice of Allowance from U.S. Appl. No. 17/403,630, dated Aug. 8, 2022.

\* cited by examiner

SELECTIVELY SHEARING DATA WHEN MANIPULATING DATA DURING RECORD PROCESSING

BACKGROUND

The present invention relates to data processing, and more specifically, this invention relates to improving performance by selectively shearing data during record processing or data sorting.

Data sorting generally includes processes that involve arranging the data into some meaningful order to make it easier to understand, analyze, visualize, etc. For example, when working with research data, sorting is a common method used for visualizing data in a form that makes it easier to comprehend what the data is representing. While data sorting allows for data to generally be better understood, actually performing the sorting can be a resource intensive process. For instance, a data sorting operation may involve moving data between different storage locations and/or types of memory altogether.

As a result, conventional implementations have experienced a significant consumption of available computing bandwidth when performing such data sorting operations. This is particularly apparent in situations where higher performance storage is utilized to perform at least a portion of the data sorting. While higher performance storage (e.g., such as local cache) provides more desirable performance metrics compared to lower performance storage (e.g., such as external disk), these higher performance metrics are typically paired with lower storage capacity in view of the higher cost associated with the higher performance storage, at least in comparison to the lower performance storage. Accordingly, performance of such conventional systems has significantly been impacted by record processing operations such as data sorting.

SUMMARY

A computer-implemented method, according to one embodiment, is for reducing data drag when manipulating data during record processing. The method includes: storing records in an input data buffer, where each of the records include a key which is appended to payload data in the respective record. Moreover, the records in the input data buffer are processed by performing the following operations on each of the records: shearing the key associated with the record from the payload data in the record, normalizing the sheared key, and storing the normalized sheared key in a first target area of memory. The records in the input data buffer are processed by determining whether a size of the payload data in the record is outside a predetermine range, and in response to determining that the size of the payload data in the record is outside the predetermine range, the payload data is stored in a second target area of memory. A data locator is also appended to the normalized sheared key in the first target area of memory to form a sheared record. The data locator corresponds to a storage location of the payload data in the second target area of memory.

A computer program product, according to another embodiment, is for reducing data drag when manipulating data during record processing. The computer program product includes a computer readable storage medium having program instructions embodied therewith. The program instructions are also readable and/or executable by a processor to cause the processor to: perform the foregoing method.

A system, according to yet another embodiment, includes: a processor, and logic that is integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
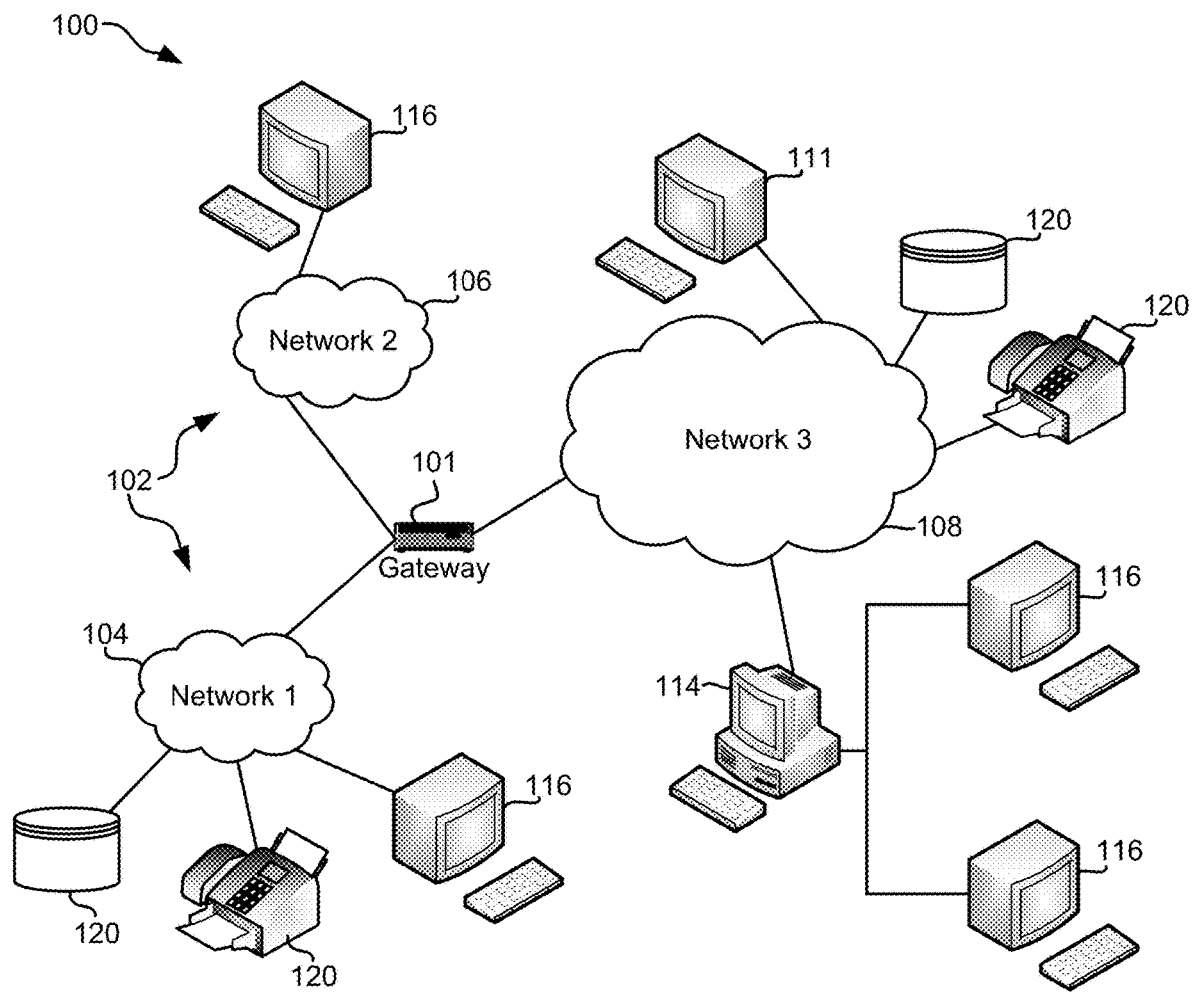
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for significantly reducing the computing resources that are consumed while performing record processing operations. For record processing operations such as data sorting, this reduction in resource consumption is achieved, at least in part, as a result of effectively reducing the amount of data movement within storage that is conducted in order to perform and/or as a result of performing the record processing, e.g., as will be described in further detail below.

In one general embodiment, a computer-implemented method is for reducing data drag when manipulating data during record processing. The method includes: storing records in an input data buffer, where each of the records include a key which is appended to payload data in the respective record. Moreover, the records in the input data buffer are processed by performing the following operations on each of the records: shearing the key associated with the record from the payload data in the record, normalizing the sheared key, and storing the normalized sheared key in a first target area of memory. The records in the input data buffer are processed by determining whether a size of the payload data in the record is outside a predetermine range, and in response to determining that the size of the payload data in the record is outside the predetermine range, the payload data is stored in a second target area of memory. A data locator is also appended to the normalized sheared key in the first target area of memory to form a sheared record. The data locator corresponds to a storage location of the payload data in the second target area of memory.

In another general embodiment, a computer program product is for reducing data drag when manipulating data during record processing. The computer program product includes a computer readable storage medium having program instructions embodied therewith. The program instructions are also readable and/or executable by a processor to cause the processor to: perform the foregoing method.

In yet another general embodiment, a system includes: a processor, and logic that is integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
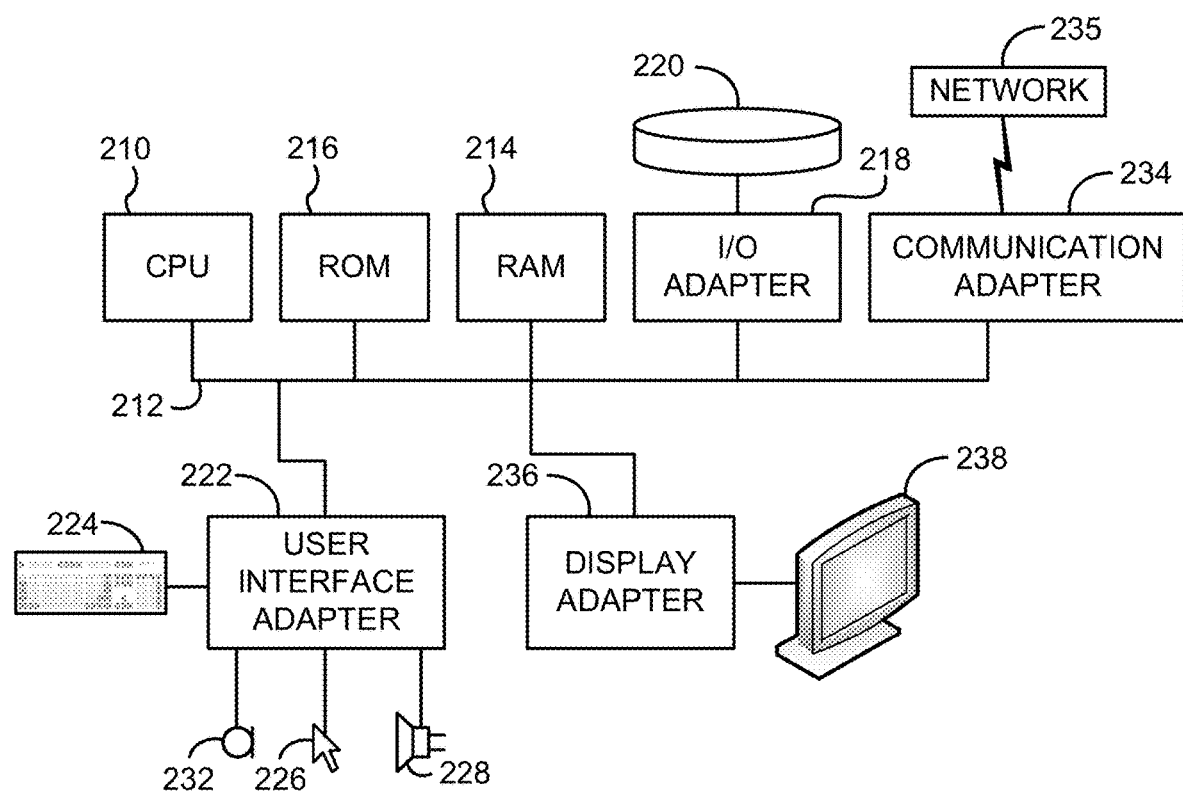
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
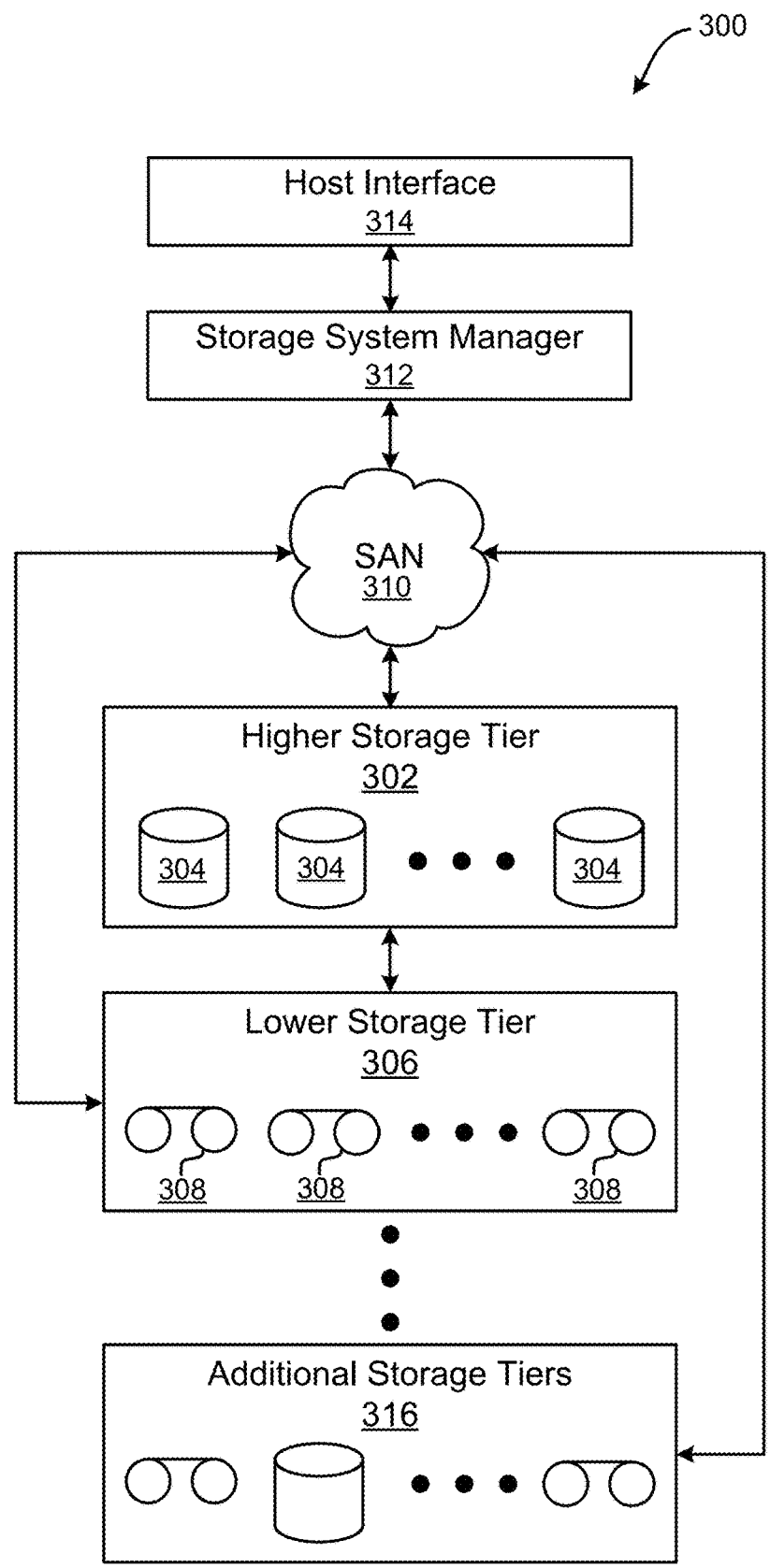
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional systems have experienced a significant consumption of available computing bandwidth when performing data sorting operations. This is particularly apparent in situations where higher performance storage is utilized to perform at least a portion of the data sorting. While higher performance storage (e.g., such as local cache) provides more desirable performance metrics compared to lower performance storage (e.g., such as external disk), these higher performance metrics are typically paired with lower storage capacity in view of the higher cost associated with the higher performance storage, at least in comparison to the lower performance storage. Accordingly, performance of such conventional systems has significantly been impacted by record processing operations such as data sorting.

In sharp contrast to these conventional shortcomings, various ones of the approaches included herein are able to significantly reduce the amount of computing resources that are consumed while performing record processing operations. For record processing operations such as data sorting, this reduction in resource consumption is achieved, at least in part, as a result of effectively reducing the amount of data movement within storage. For instance, by shearing a key from the payload data in a given record such that the record may effectively be processed without moving and/or analyzing the payload data itself, some of the approaches included herein are able to significantly improve the efficiency at which the overarching system is able to operate, while also maintaining successful data operations, e.g., as will be described in further detail below.

Figure 4A:
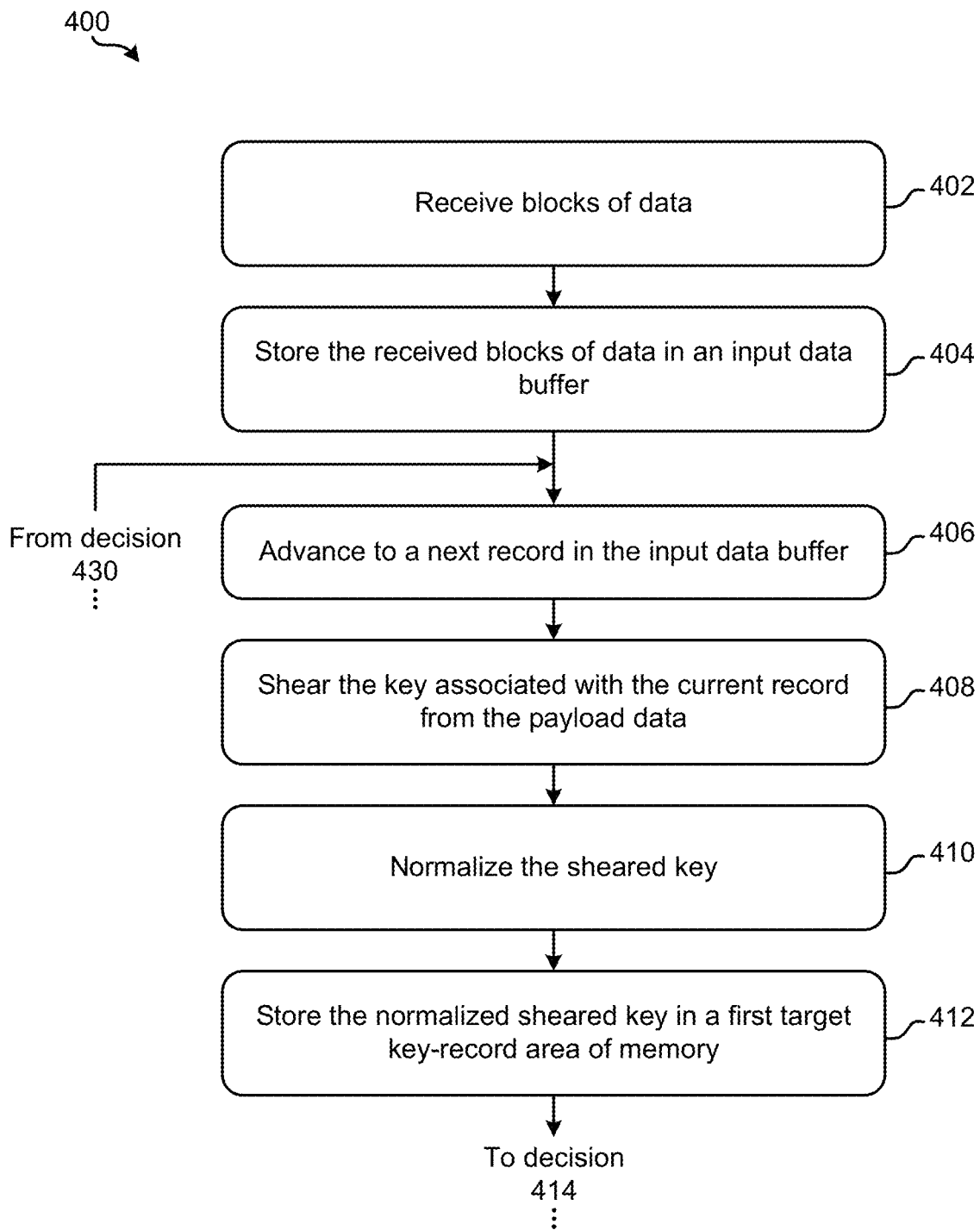
FIG. 4A is a flowchart of a method, in accordance with one embodiment.
Figure 4A:
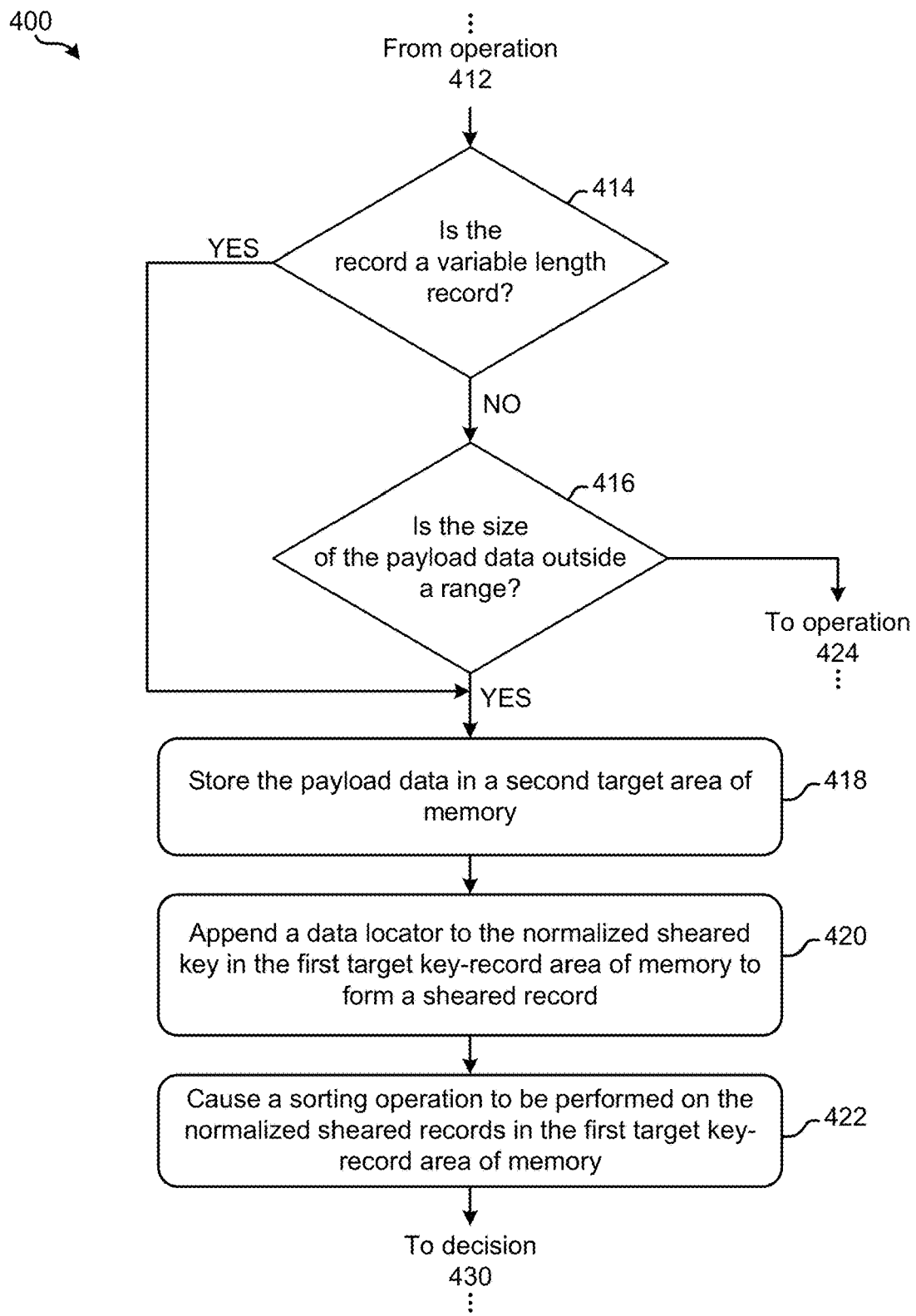
Figure 4A:
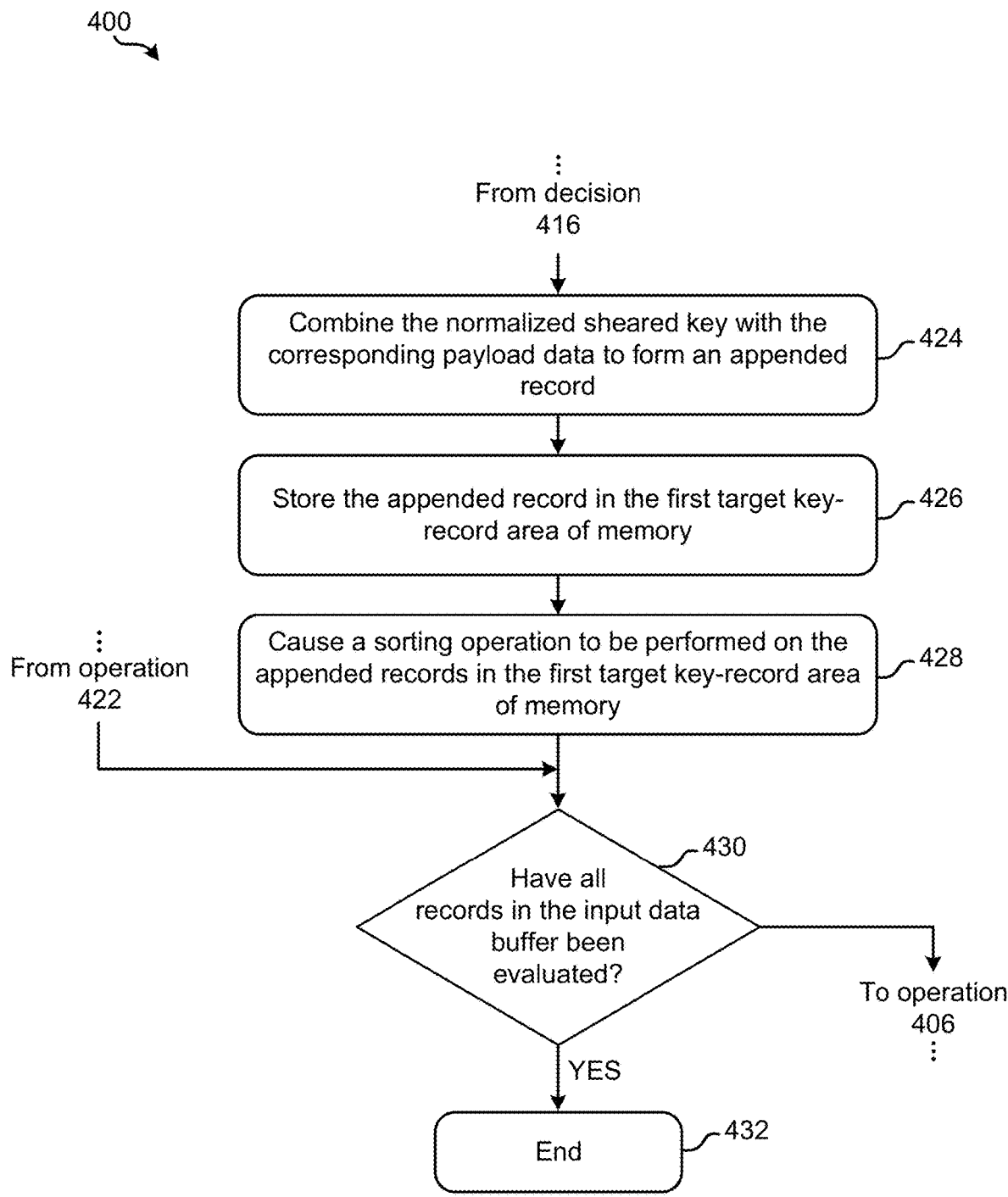

Referring now to FIG. 4A, a flowchart of a method 400 for reduce data drag when manipulating data during record processing is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, one or more of the operations included in method 400 may be performed by a central storage controller that is electrically coupled to an input buffer as well as various portions of memory. In other embodiments, the method 400 may be partially or entirely performed by a controller, a processor, a computer, etc., or some other device having one or more processors therein. Thus, in some embodiments, method 400 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving blocks of data. Each block of data is a grouping of information which includes one or more logical records and a block header therein. While the information in a block of data received in operation 402 may have different forms depending on the particular approach, FIG. 5B below depicts an illustrative block 502 having a block header 510 and various logical records 512 therein. It is also noted that the full length BlockLen of the block 502 has not been utilized, thereby leaving a portion of the block 502 unused (e.g., padded).

Referring back to FIG. 4A, the blocks of data may be received from different locations and/or sources depending on the approach. For instance, in some approaches at least some of the blocks of data may be received from an application that is being performed by the overarching system, while in other approaches at least some of the blocks of data may be received directly from a user for storage in memory. In still other approaches, at least some of the data blocks may be received from a remote storage system in response to performing a data relocation operation.

Proceeding to operation 404, method 400 further includes storing the received blocks of data (and the records included therein) in an input data buffer. The input data buffer may be of any desired type, but preferably has a large enough storage capacity to hold a number of data blocks. The blocks of data received in operation 402 may also be separated into each of the respective blocks before being stored in the input data buffer individually. It should also be noted that in preferred approaches, each of the records include a key which is appended to payload data that is in the record. It follows that the blocks are stored in a portion of memory based on how the data is actually read from the source, while key and payload data separation (e.g., shearing) is performed in certain situations.

A key may include information (e.g., metadata) which describes the payload data, e.g., such as the type of data included in the payload, an author and/or administrator of the record itself, an intended storage location for the payload data, other records which include payload data that corresponds to the payload data in the present record, etc. It follows that the key provides various information which may be used to help satisfy any data operations that may be associated with the received record. The keys may also be formatted differently depending on the approach and/or the record in which the key is included, thereby affecting the types of operations and/or systems that are able to utilize the keys. In other words, certain applications and/or operations may only support (e.g., be configured to utilize) certain types of data formats. Thus, the key again provides information which is valuable in determining whether the payload data in a given record is supported by the given application, operation, etc., without having to actually inspect the contents of the payload data itself.

From operation 404, method 400 proceeds to operation 406 which includes advancing to a next record in the input data buffer. In other words, operation 406 includes analyzing another one of the records in the input buffer. According to an example, which is in no way intended to limit the invention, a first time method 400 is performed, operation 406 may include advancing to a first record in the input data buffer, while subsequent iterations of method 400 may include advancing to a next record in the input data buffer. It follows that some of the processes included in method 400 may be repeated in order to process each of the records that are in the input data buffer, e.g., as will be described in further detail below.

It should also be noted that the "first" record and the "next" record in the input data buffer may vary depending on the particular approach. For instance, in some situations the input data buffer may be designed to operate in a first-in-first-out (FIFO) manner in which case a "first" record is the oldest record in the buffer, and each "next" record that the method 400 advances to is the next oldest record in the buffer. However, in other approaches the input data buffer may be designed to operate in a last-in-first-out (LIFO) manner in which case a "first" record is the newest record in the buffer, and each "next" record that the method 400 advances to is the next newest record in the buffer. In still other approaches, the input data buffer may advance to a next record in the buffer, where the "next" record is selected randomly, based on user input, based on a size of the entries in the buffer, etc.

FIG. 4A also includes shearing the key associated with the current record from the payload data in the given record. See operation 408. In other words, in response to advancing to a next record in the input data buffer, operation 408 includes actually shearing the key in the "next" record from the payload data that is also in the "next" record. The process of shearing the key from the payload data effectively separates the two, thereby forming two portions of the original record. The process of shearing the key from the data payload in a given record may be performed in some approaches by inspecting a beginning (e.g., header) of the record to identify the extents of the record herein. The extents of the record may thereby be used to determine the boundaries of the key may thereby be identified and used to remove the information in the key from the remainder of the record (i.e., the payload data). However, different shearing and/or record inspection processes may be implemented to perform operation 408, e.g., as would be appreciated by one skilled in the art after reading the present description. For instance, extraction code may be used to identify the key in a given record and extract the information included therein.

As mentioned above, the key may include information such as metadata which can describe the payload data. It should also be noted that the key itself is preferably smaller (e.g., includes less information) than the payload data. However, the key and/or the payload data itself may also vary in size depending on the approach. For instance, in some approaches the payload data and the key may both have predetermined sizes. According to an example, which is in no way intended to limit the invention, the key may have a fixed size of 512 bytes while the payload data has a fixed size of greater than 512 bytes (e.g., 1 megabyte). However, in other approaches the payload data and/or the key may have variable lengths. The type of information (e.g., data, metadata, etc.) included in the payload data and/or the key may also vary depending on the given approach. According to another example, which again is in no way intended to limit the invention, the current record may be a variable length logical record which includes a record descriptor word (RDW) followed by the actual payload data. In this particular example, the key may include a field describing the record in which the first 2 bytes contain the logical length of the overall logical record (e.g., including a 4 byte RDW).

From operation 408, method 400 proceeds to operation 410 which includes normalizing the sheared key. As noted above, the key and the information included therein may have different forms depending on the particular approach. In other words, the key is not always stored in a form which the overarching system and/or controller therein is able to interpret, e.g., such as a binary format. For example, depending on the given record being examined, the key included therein may be some formatted number, e.g., such as a packed decimal or zone decimal key; involve some alternate sequence of sorting; etc.

Although the key may be sheared from the corresponding payload data, the particular form of the information in the key has an impact on whether a particular system, controller, program, etc. is able to actually utilize the information in the key. Accordingly, the process of normalizing the key sheared from the present record may effectively transform the key such that it is considered (e.g., referred to herein as) a "superkey" (e.g., as seen in FIGS. 5E-5I below) having a format which is supported by the system and/or controller performing the various processes of method 400.

Figure 4B:
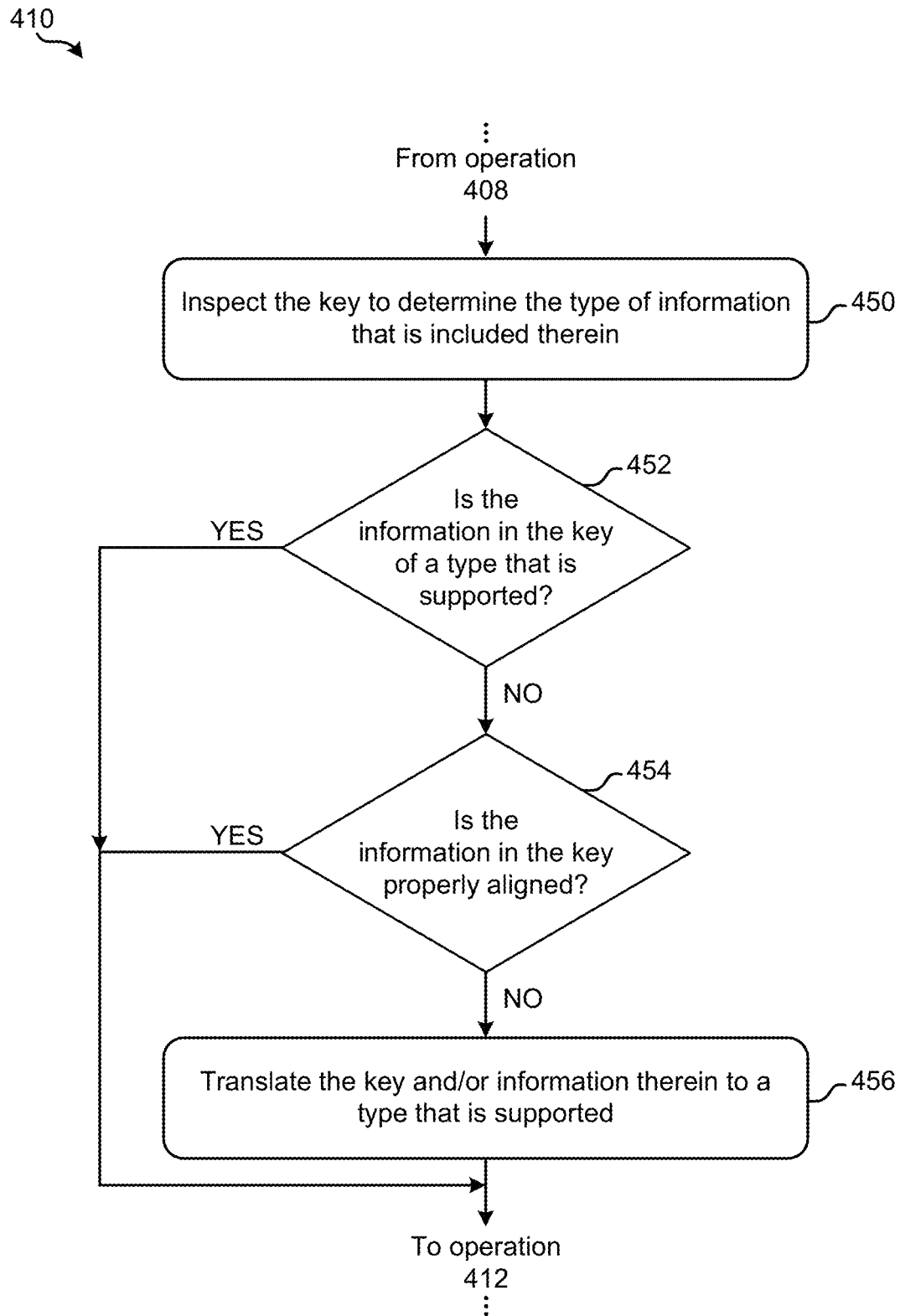
FIG. 4B is a flowchart of sub-processes for one of the operations in the method of FIG. 4A, in accordance with one embodiment.

Referring momentarily now to FIG. 4B, exemplary sub-processes of normalizing a key are illustrated in accordance with one embodiment, one or more of which may be used to perform operation 410 of FIG. 4A. However, it should be noted that the sub-processes of FIG. 4B are illustrated in accordance with one embodiment which is in no way intended to limit the invention.

As shown, sub-operation 450 of normalizing a key according to some approaches includes actually inspecting the key to determine the type of information that is included therein. As noted above, certain types of information are not supported in some approaches and therefore are changed before any further processing of the information can occur. It follows that the type of data that is actually included in the payload itself may be used to determine whether to transform the normalized sheared key. Accordingly, decision 452 includes determining whether a type of information that is included in the key is supported by the given approach. This determination may be made by comparing the type of key information and/or other information therein with a predetermined list of keys and/or information types that are supported by the system and/or the various components included therein.

In response to determining that the type of the information in the key is not supported, the flowchart proceeds to decision 454 which includes determining whether the information in the key is properly aligned. Depending on the approach, payload data and/or the key itself may be aligned differently in the overarching record. For instance, in some records, portions of the key may be misaligned and interspersed among the payload data itself, while in other records, the key information may be arranged in a contiguous manner. In situations where the key information and/or the payload data is misaligned, it is desirable that the information and/or data is rearranged such that the key and corresponding payload data are easily distinguishable.

Accordingly, in response to determining that the information in the key is not properly aligned, the flowchart proceeds from decision 454 to sub-operation 456. There, sub-operation 456 includes translating the key and/or information therein to a type that is supported by the system as well as rearranging the information in the key to be properly aligned. This effectively normalizes the key according to some approaches before returning to operation 412 of FIG. 4A as shown.

In some approaches, which are in no way intended to limit the invention, sub-operation 456 includes attaching a stability index to the sheared key. The stability index helps maintain a relative order of the payload data in the given record with respect to other payload data. For instance, the stability index may be used to retain an order of the payload data from the given record relative to the other payload data in the second target area of memory from various other records.

However, returning to decision 452, the flowchart may proceed directly to operation 412 of FIG. 4A in response to determining that the type of key and/or the information therein is supported. By avoiding any translation of the key and/or information therein and thereby reducing computational overhead associated with performing the sub-processes of FIG. 4B, efficiency of the overall system is improved. Similarly, the flowchart may proceed directly to operation 412 of FIG. 4A from decision 454 in response to determining that the information in the key is properly aligned.

Returning now to FIG. 4A, operation 412 includes storing the normalized sheared key in a first target key-record area of memory. In other words, operation 412 includes storing the normalized sheared key in a predetermined portion of memory. Moreover, decision 414 includes determining whether the given record is a variable length record. As mentioned above, the payload data and/or the key may have variable lengths in some records. While this varying length may be utilized to better accommodate certain groupings of data depending on the given approach, it is more difficult to allocate an amount of space in various buffers, memory, etc., that is sufficiently large to store the data itself, but which also does not unnecessarily waste storage capacity by leaving it unutilized. Accordingly, records having a variable length are preferably normalized to have a fixed length to avoid any inefficiencies that may otherwise be caused by how the record is ultimately processed, e.g., as would be appreciated by one skilled in the art after reading the present description. Accordingly, method 400 jumps directly to operation 418 in response to determining that the given record is a variable length record. There, operation 418 includes storing the payload data in a second target area of memory which is different than the first target key-record area of memory. In other words, the payload data remains decoupled from the corresponding key, e.g., as will be described in further detail below.

However, in response to determining that the given record is not a variable length record, method 400 proceeds to decision 416 from decision 414. There, decision 416 includes determining whether a size of the payload data in the given record is outside a predetermine range. However, it should be noted that "outside a predetermine range" is in no way intended to limit the invention. Rather than determining whether a value is outside a predetermine range, equivalent determinations may be made, e.g., as to whether a value is within a predetermined range, whether a value is above a threshold, whether an absolute value is above a threshold, whether a value is below a threshold, etc., depending on the desired approach.

As previously mentioned, moving data between different locations in a storage system introduces latency and reduces the operating efficiency of the system as a whole. Moreover, the sheared keys undergo a considerable amount of processing in order to successfully store and/or process the received blocks of data which correspond thereto. It follows that removing the payload data from the respective key prior to the aforementioned processing for at least some of the records would reduce the latency experienced by effectively decreasing the amount of information that is processed.

While keeping the sheared normalized keys decoupled from the respective payload data has desirable effects on performance of the system, these improvements are at least somewhat proportional to the amount of data that is not being processed. It follows that for certain situations in which the payload data is sufficiently small in size and the added compute overhead introduced by processing the payload data is negligeable, it may be desirable to recombine the payload data with the normalized key. Thus, by determining whether the size of the payload data in the given record is outside a predetermine range, decision 416 is effectively able to determine whether the payload data should remain decoupled from the sheared normalized keys during further processing.

With continued reference to FIG. 4A, the predetermined range utilized in decision 416 may be set by a user, correspond to the type of key, be based on the type of storage being used, etc. Accordingly, decision 416 may involve actually identifying the predetermined range that corresponds to the currently evaluated key and/or the initial record. In response to determining that the size of the payload data in the given record is outside the predetermine range, method 400 proceeds from decision 416 to operation 418. There, operation 418 includes storing the payload data in a second target area of memory. Again, in situations where the payload data is sufficiently large in size, it is preferred that the sheared key remains decoupled from the payload data during processing. Thus, by storing the payload data in a second target area of memory, the payload data is maintained in its current state, e.g., until the key has been fully processed. The second target area of memory may, in some approaches, be lower performance storage than the first target key-record area of memory and/or lower performance storage than the memory in which the input data buffer is formed. This desirably frees storage capacity in higher performance memory, thereby affectively increasing the achievable throughput of the overarching system.

While the payload is actually stored in the second target area of memory, it is desirable that the key is updated to reflect this storage location for future operations. For instance, once the key has been sufficiently processed, it may be recombined with the payload data and/or data operations may be performed using the payload data itself. Accordingly, operation 420 includes appending a data locator to the normalized sheared key in the first target key-record area of memory to form a sheared record. The data locator preferably corresponds to a storage location of the payload data in the second target area of memory so that the key is able to reflect the storage location as mentioned above. This allows any applications to know the location where the corresponding payload data is stored during key record and payload processing. This is particularly desirable in situations involving the sort process, as the sort process eventually involves transforming the record by restoring the key record and payload data (referenced by the data locator) into a single continuous area of storage, e.g., such that it can be written to a storage location in memory.

Depending on the approach, the process of appending the data locator to the normalized sheared key may include updating a header of the key, actually writing the data locator in a padded (e.g., unused) portion of the key, etc., or any other processes which would be apparent to one skilled in the art after reading the present description. In some approaches the data locator may also be stored in a central lookup table, e.g., such as a logical-to-physical lookup table, or elsewhere for redundancy.

From operation 420, method 400 proceeds to operation 422 which includes causing a sorting operation to be performed on the sheared records in the first target key-record area of memory. As previously mentioned, by determining that the payload data is sufficiently large in size and keeping it decoupled from the key, performing record processing such as data sorting is much more efficient than has been conventionally achievable. This allows for performance of the overall system to be improved.

It should also be noted that the process of causing the sorting operation to be performed on the sheared records may vary depending on the approach. For instance, the specific processes involved with performing the sorting operation may differ depending on the specific type of sorting operation, the types of information that are included in the key, user preferences, etc. It follows that the process of causing a sorting operation to be performed on the sheared records may involve sending one or more instructions to one or more logical and/or physical components in the storage system, e.g., as would be appreciated by one skilled in the art after reading the present description.

From operation 422, the flowchart of FIG. 4A proceeds to decision 430 which includes determining whether each of the records in the input data buffer have been evaluated. In response to determining that at least one record remains in the input data buffer unevaluated, method 400 returns to operation 406 and advances to the next of the at least one record that remains in the input data buffer such that various ones of the processes included in FIG. 4A may be repeated for the next record. However, in response to determining that each of the records in the input data buffer have been evaluated, method 400 proceeds from decision 430 to operation 432 where method 400 may end. However, it should be noted that although method 400 may end upon reaching operation 432, any one or more of the processes included in method 400 may be repeated in order to process additional blocks of data. In other words, any one or more of the processes included in method 400 may be repeated for subsequently received blocks of data.

Returning now to decision 416, it should be noted that method 400 proceeds to operation 424 in response to determining that the size of the payload data in the given record is not outside the predetermine range. There, operation 424 includes combining the normalized sheared key with the corresponding payload data to form an appended record. As previously mentioned, while keeping the sheared normalized keys decoupled from the respective payload data has desirable effects on performance of the system, these improvements are at least somewhat proportional to the amount of data that is not being processed. It follows that for certain situations, e.g., such as those in which the payload data is sufficiently small in size and the added compute overhead introduced by processing the payload data is negligeable, it may be desirable to recombine the payload data with the normalized key. Thus, by determining that the size of the payload data in the given record is not outside a predetermine range, method 400 has effectively determined that the payload data can be coupled to the previously sheared keys before performing further processing, e.g., because processing the payload data also will not have a sufficiently negative affect on performance of the overall system.

From operation 424, method 400 proceeds to operation 426 which includes storing the appended record in the first target key-record area of memory. In other words, operation 426 includes storing the payload data in addition to the corresponding key in the first target key-record area of memory. Furthermore, operation 428 includes actually causing a sorting operation to be performed on the appended records in the first target key-record area of memory. As previously mentioned, by determining that the payload data is sufficiently small in size, recoupling it to the key before performing record processing such as data sorting does not significantly affect the performance in a negative way. Moreover, the process of causing the sorting operation to be performed on the appended records may vary depending on the approach. For instance, the specific processes involved with performing the sorting operation in operation 422 may differ from the specific processes involved with performing the sorting operation in operation 428, e.g., as would be appreciated by one skilled in the art after reading the present description.

From operation 428, the flowchart of FIG. 4A may end. However, it should be noted that although method 400 may end in response to performing operation 428, any one or more of the processes included in method 400 may be repeated in order to process additional blocks of data. In other words, any one or more of the processes included in method 400 may be repeated for subsequently received blocks of data.

It follows that the various processes included in method 400 are desirably able to significantly reduce the amount of computing resources that are consumed while performing record processing operations. For record processing operations such as data sorting, this reduction in resource consumption is achieved, at least in part, as a result of effectively reducing the amount of data movement within storage that is conducted in order to perform and/or as a result of performing the record processing. For instance, by shearing a key from the payload data in a given record such that the record may effectively be processed without moving and/or analyzing the payload data itself, some of the approaches included herein are able to significantly improve the efficiency at which the overarching system is able to operate, while also maintaining successful data operations.

Referring now to FIGS. 5A-5G, various records and the potential contents thereof are illustrated in accordance with several embodiments. As an option, any of the embodiments depicted in FIGS. 5A-5G may be implemented in conjunction with features from any other embodiment listed herein, such as those described with reference to the other FIGS., such as FIGS. 4A-4B. However, such embodiments and others presented herein may be used in various applications and/or in permutations which may or may not be specifically described in the illustrative embodiments listed herein. Further, the embodiments presented in FIGS. 5A-5G may be used in any desired environment.

Figure 5A:
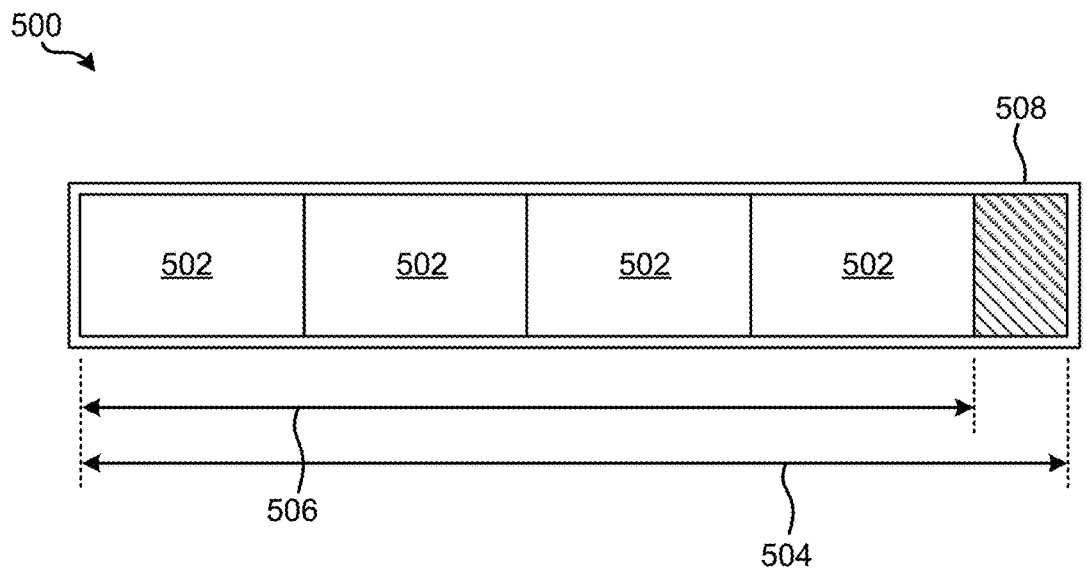
FIGS. 5A-5L are partial representational views of various records and the contents thereof, in accordance with several embodiments.

As shown, FIG. 5A depicts an input data buffer 500 which includes a number of blocks 502 therein. While the input data buffer 500 includes a number of blocks 502, the size of the buffer may not be perfectly divisible by the size of the blocks themselves. Thus, the overall length of the blocks 504 may be less than the overall length 506 of the input data buffer 500. In other words, the input data buffer 500 may include an unused portion 508 that is unable to provide an adequate amount of unused storage space to store another block. This unused portion of the buffer may be padded in some approaches, while in other approaches it may be designated as reserved space, e.g., a header for the buffer.

Each of the blocks 502 in the input data buffer 500 of FIG. 5A include a number of records therein. Accordingly, looking to FIG. 5B, a block 502 is illustrated as including a block header 510 as well as a number of logical records 512. It is also noted that the full length BlockLen of the block 502 has not been utilized, thereby leaving a portion 514 of the block 502 unused. This unused portion 514 may be padded in some approaches, while in other approaches it may simply remain unused, e.g., if the amount of information in the given block 502 changes.

Figure 5B:
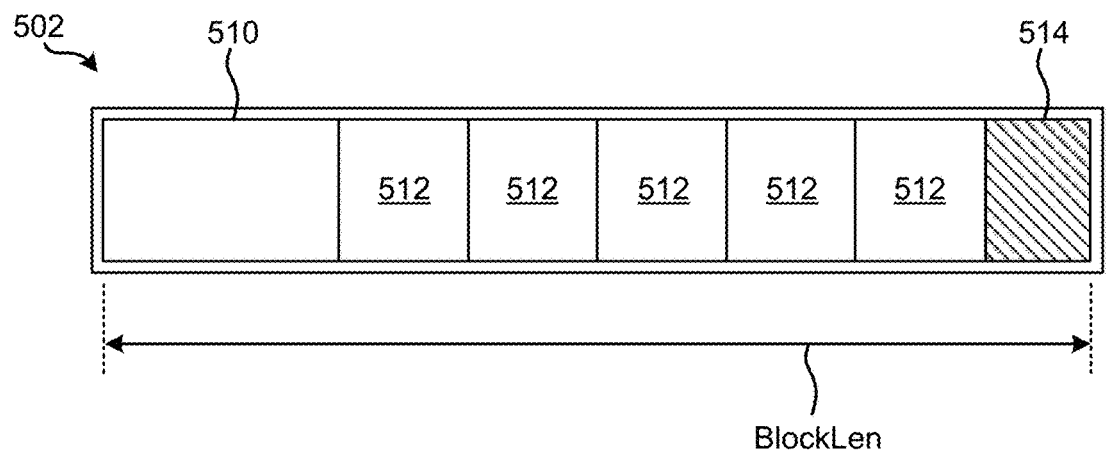
Figure 5C:
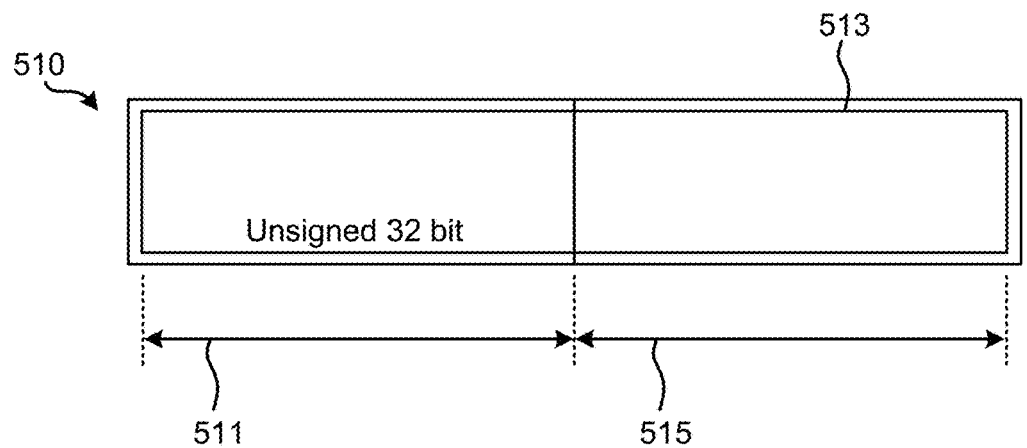
Figure 5D:
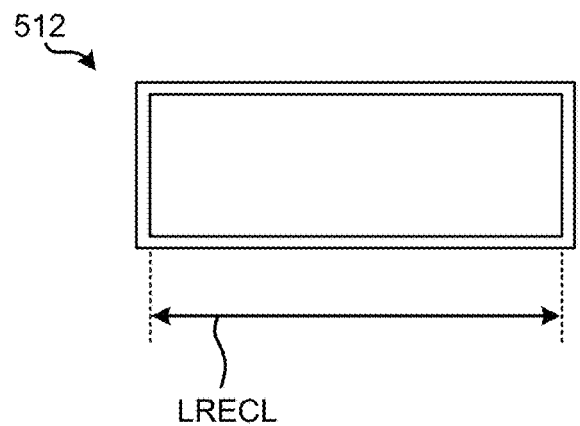

FIG. 5C further depicts a block header 510 in accordance with an illustrative approach which is in no way intended to limit the invention. Specifically, the block header 510 is depicted as having an unsigned block length (e.g., size) of 32 bits, while the length 511 of the block header itself is also represented. In some approaches, the block header length 511 is 4 bytes. The block header 510 also includes a portion of reserved (e.g., unused) space 513. The reserved space 513 may be used to store information (e.g., metadata) associated with the block header 510. Moreover, the reserved space 513 has a length 515 which in some approaches may be 4 bytes. FIG. 5D also illustrates one of the logical records 512 from FIG. 5B which has a length LRECL that is substantially similar to the lengths of the other logical records in the given block.

Referring momentarily now to FIG. 5B, each of the logical records 512 may be examined and a determination ultimately made as to whether the key and payload data therein should remain coupled to each other or sheared from each other. As noted above, this determination is made primarily on the actual size of the payload data, but other factors may be taken into consideration. For instance, variable length records may remain in a sheared state, e.g., as is shown in FIG. 5E.

Figure 5E:
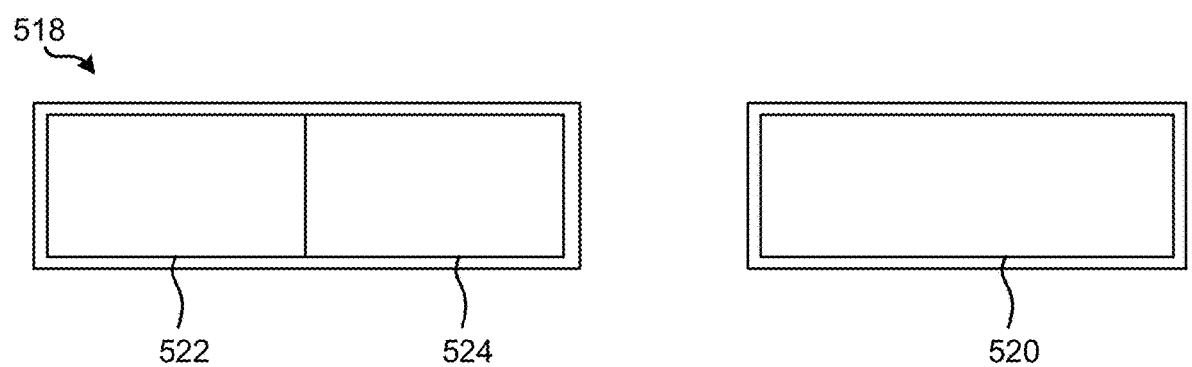

Looking to FIG. 5E, one of the records 512 depicted in the block 502 of FIG. 5A has been sheared such that the key 518 is maintained separately from the payload data 520. Moreover, the sheared key 518 itself includes a normalized key portion 522 in addition to a data locator 524 that is appended thereto. As noted above, it is preferred that a sheared key is able to locate the corresponding payload data in storage. The data locator 524 is thereby able to maintain the current storage location for the payload data. It should also be noted that for situations involving a fixed length record, the data locator 524 may simply be a pointer that points to the actual storage location of the payload data. However, in situations where the record is variable length, the data locator 524 may serve as both a pointer to the payload data storage location as well as an indication of the length of the payload data that has been sheared from the key portion 522. This allows for the payload data to be retrieved without having to actually inspect the data in order to determine where the given payload actually ends in view of its variable (e.g., otherwise unknown) length.

Figure 5F:
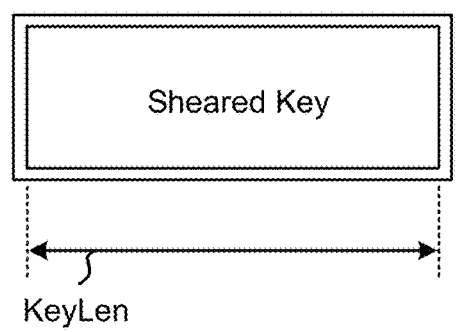
Figure 5G:
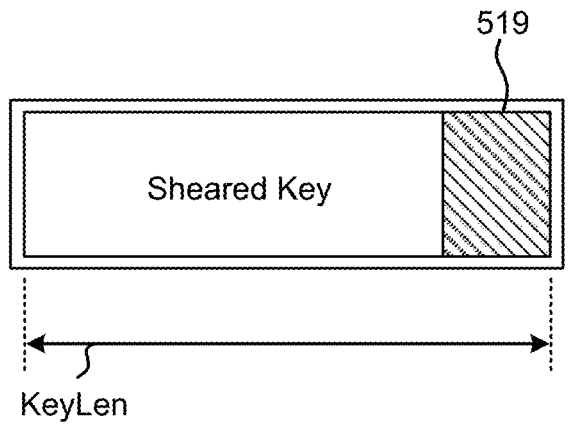
Figure 5H:
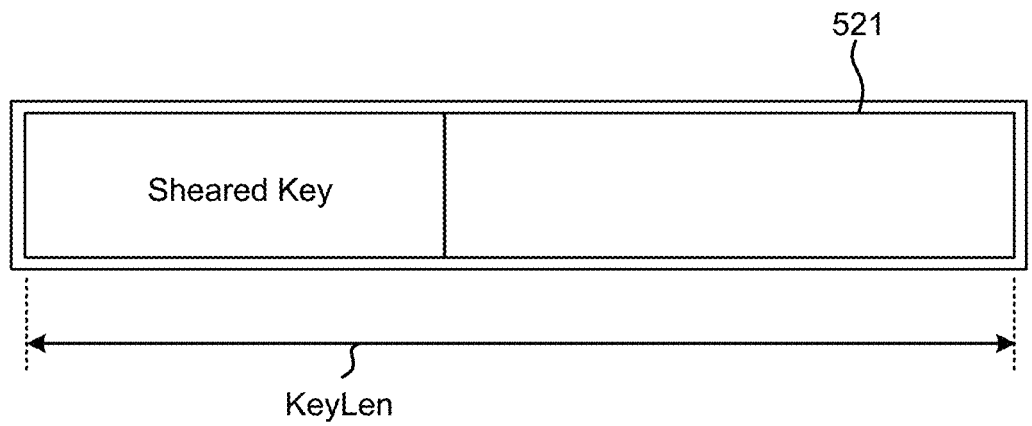
Figure 5I:
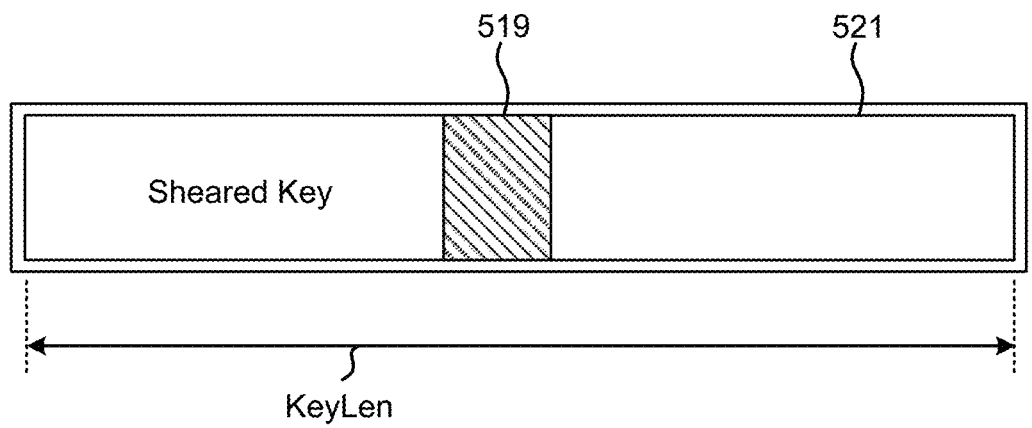

The sheared key 518 may have different forms depending on the particular approach. For instance, FIG. 5F illustrates a sheared key (e.g., extracted key) having no padding and an overall length of KeyLen, while FIG. 5G illustrates a sheared key which includes a portion of padding 519 in the overall length KeyLen of the key. Moreover, FIG. 5H depicts a sheared key having a stability index 521 appended thereto. As mentioned above, the stability index helps maintain a relative order of the payload data in the given record with respect to other payload data. For instance, the stability index may be used to retain an order of the payload data from the given record relative to the other payload data in the second target area of memory from various other records.

It should also be noted that even keys having a stability index appended thereto may incorporate a padded section. For instance, FIG. 5I includes padding 519 that separates the sheared key from the stability index 521, but in other approaches the padding 519 may be positioned before the sheared key (e.g., as a reserved header) or after the stability index 521 (e.g., as a reserved tail section).

Figure 5J:
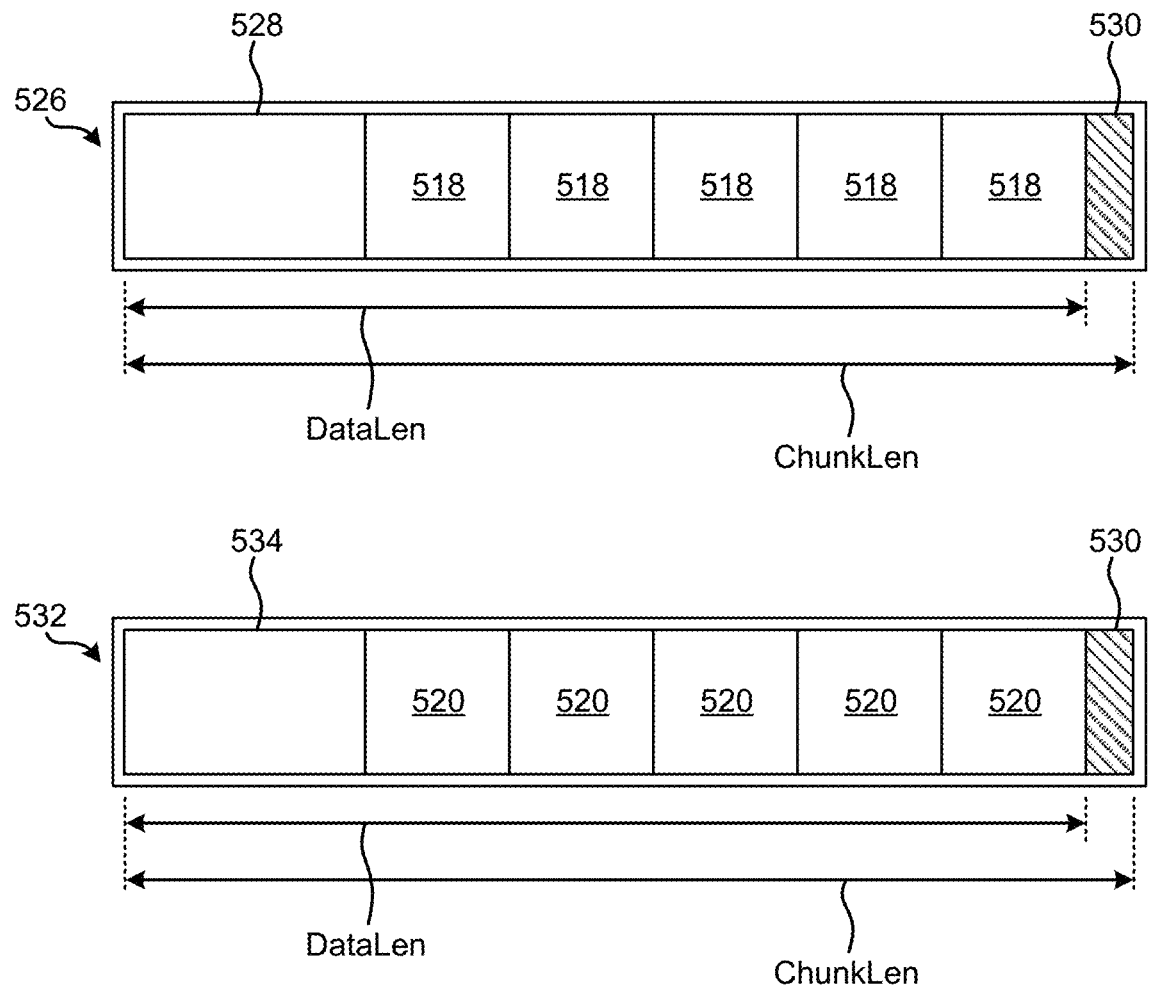

FIG. 5J further depicts the two different locations in memory where the sheared keys 518 and payload data 520 are stored. Specifically, the key chunk 526 includes a chunk header 528 as well as a number of sheared keys 518 therein. The key chunk 526 also includes a padded section 530 to compensate for the difference in the length of the data DataLen in the key chunk 526 and the overall length ChunkLen of the key chunk 526 itself. Similarly, the payload chunk 532 includes a chunk header 534 as well as a number of the payload data 520 therein. The payload chunk 532 also includes a padded section 530 to compensate for the difference in the length of the data in the payload chunk 532 and the overall length of the payload chunk 532 itself.

The key chunk 526 is preferably located in a first target key-record area of memory, while the payload chunk 532 is located in a second target area of memory. As noted above, the first target key-record area of memory may be located in memory components which have a higher level of performance than that of the memory components in which the second target area of memory is located.

Figure 5K:
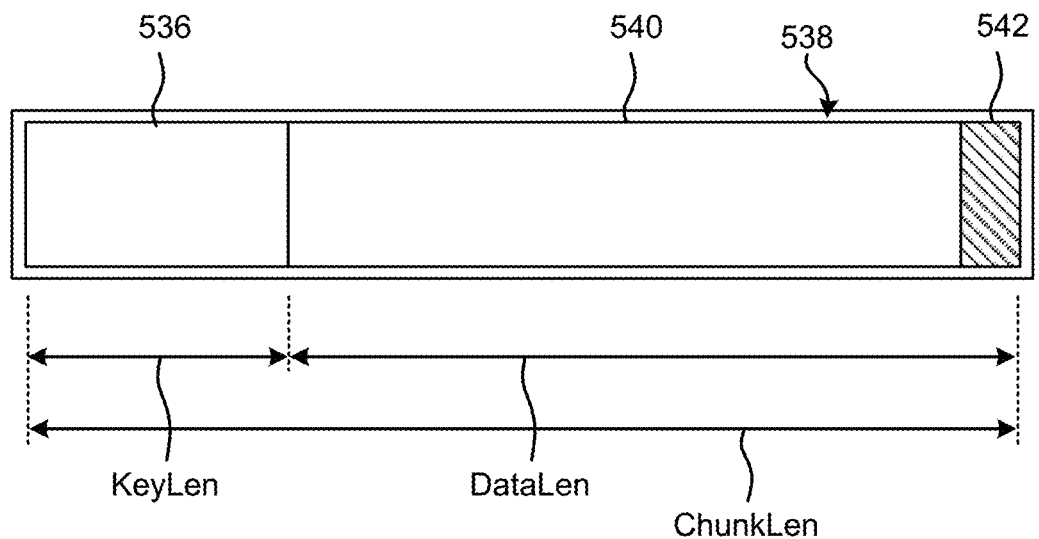

Looking now to FIG. 5K, another of the records 512 depicted in the block 502 of FIG. 5A remains in an appended state such that the normalized key portion 536 is coupled to the payload data 538. Moreover, the payload data 538 itself may include a logical record portion 540 as well as a padded section 542 to account for a difference between the length DataLen (e.g., size) of the logical record and a length ChunkLen (e.g., storage capacity) of the overall payload. It should also be noted that the contents of the normalized key portions 522, 536 shown in FIGS. 5E, 5K may vary depending on the approach. For instance, in some approaches one or both of the normalized key portions 522, 536 may be padded.

Figure 5L:
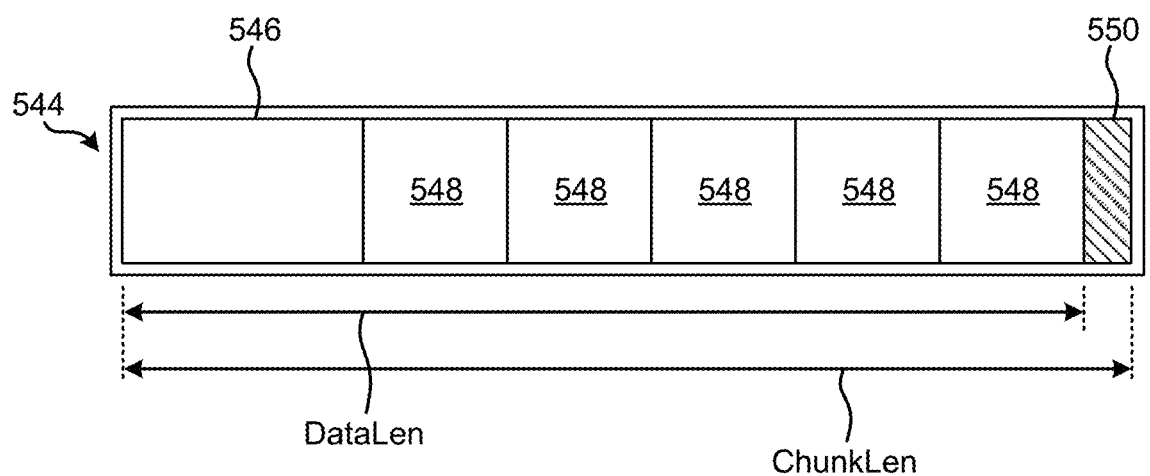

FIG. 5L further depicts the location in memory where the records which remain in an appended state are stored. Specifically, the record chunk 544 includes a chunk header 546 as well as a number of appended records 548 therein. Each of the appended records 548 further include a normalized key portion which is coupled to payload data, e.g., as shown in the appended record of FIG. 5K. As noted above, the decision to keep a normalized key portion appended to the corresponding payload data may be based on the size of the payload data itself. In other approaches, the decision on whether the payload data should remain appended to the key may be based on whether the record is of variable length. The record chunk 544 further includes a padded section 550 to compensate for the difference in the length DataLen (e.g., size) of the data in the record chunk 544 and the overall length ChunkLen (e.g., storage capacity) of the record chunk 544 itself.

It follows that various ones of the processes included herein are able to perform key extraction processing in a more efficient manner than has been conventionally achievable. These significant improvements result at least in part due to the reduction in data movement and data processing that is achieved by the various approaches included herein.

For instance, by reading and storing input data in a buffer, each record included therein may be evaluated. For a given record, the key included therein is sheared away from the corresponding payload data and stored in a target key-record area of memory. A determination is made as to whether the payload data itself is sufficiently large (e.g., includes a sufficiently large amount of data) to warrant the key remaining sheared from the payload data during processing. As noted above, this allows for computing overhead to be reduced and efficiency of the system as a whole to increase.

However, other factors may be considered in determining whether the payload data should remain sheared from the key, e.g., such as whether the key should be transformed, whether the record itself has a variable length, etc. Performing data processing like data sort operations is a CPU intensive process, thereby making the improvements that are achieved by some of the approaches herein even more significant.

It should also be noted that these improvements are achieved without creating any new keys or additional metadata aside from the data locator that is utilized in some approaches. Even in such approaches, the data locator may be as small as 8 bytes, thereby minimizing data storage usage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for reducing data drag when manipulating data during record processing, the method comprising:

storing records in an input data buffer, wherein each respective record, of the records, includes a key which is appended to payload data in the respective record; and processing the records in the input data buffer by performing the following operations on each of the respective records:

shearing the key associated with the respective record from the payload data in the respective record, normalizing the sheared key, storing the normalized sheared key in a first target area of memory, in response to determining that the respective record is not a variable length record, determining whether a size of the payload data in the respective record is outside a predetermine range, in response to determining that the size of the payload data in the respective record is outside the predetermine range, storing the payload data in a second target area of memory, and appending a data locator to the normalized sheared key, in the first target area of memory, to form a sheared record, wherein the data locator corresponds to a storage location of the payload data in the second target area of memory.

2. The computer-implemented method of claim 1, comprising:
processing the records in the input data buffer by performing the following operations on each of the respective records:
in response to determining that the size of the payload data in the respective record is not outside the predetermine range, combining the normalized sheared key with the payload data to form an appended record, and
storing the appended record in the first target area of memory.

3. The computer-implemented method of claim 2, comprising:
causing a sorting operation to be performed on the appended records in the first target area of memory.

4. The computer-implemented method of claim 1, comprising:
causing a sorting operation to be performed on the sheared records in the first target area of memory.

5. The computer-implemented method of claim 1, wherein normalizing the sheared key includes:
attaching a stability index to the sheared key, wherein the stability index maintains a relative order of the payload data in the respective record with respect to other payload data in the second target area of memory.

6. The computer-implemented method of claim 1, wherein normalizing the sheared key includes:
determining whether a type of information in the key, associated with the respective record, is supported;
in response to determining that the type of information in the key, associated with the respective record, is not supported, determining whether the information in the key, associated with the respective record, is properly aligned; and
in response to determining that the information in the key, associated with the respective record, is not properly aligned, normalizing the sheared key.

7. The computer-implemented method of claim 1, comprising:
processing the records in the input data buffer by performing the following operations on each of the respective records:
determining whether the respective record is a variable length record; and
in response to determining that the respective record is a variable length record:
storing the payload data in the second target area of memory, and appending the data locator to the normalized sheared key in the first target area of memory to form the sheared record.

8. A computer program product for reducing data drag when manipulating data during record processing, the computer program product comprising a computer readable storage medium having program instructions embodied therewith, the program instructions readable and/or executable by a processor to cause the processor to:
store, by the processor, records in an input data buffer, wherein each respective record, of the records, includes a key which is appended to payload data in the respective record; and process, by the processor, the records in the input data buffer by performing the following operations on each of the respective records:
shear, by the processor, the key associated with the respective record from the payload data in the respective record,
normalize, by the processor, the sheared key,
store, by the processor, the normalized sheared key in a first target area of memory,
in response to determining that the respective record is not a variable length record, determine, by the processor, whether a size of the payload data in the respective record is outside a predetermine range,
in response to determining that the size of the payload data in the respective record is outside the predetermine range, store, by the processor, the payload data in a second target area of memory, and
append, by the processor, a data locator to the normalized sheared key, in the first target area of memory, to form a sheared record, wherein the data locator corresponds to a storage location of the payload data in the second target area of memory.

9. The computer program product of claim 8, wherein the program instructions are readable and/or executable by the processor to cause the processor to:
process, by the processor, the records in the input data buffer by performing the following operations on each of the respective records:
in response to determining that the size of the payload data in the respective record is not outside the predetermine range, combine, by the processor, the normalized sheared key with the payload data to form an appended record, and
store, by the processor, the appended record in the first target area of memory.

10. The computer program product of claim 9, wherein the program instructions are readable and/or executable by the processor to cause the processor to:
cause, by the processor, a sorting operation to be performed on the appended records in the first target area of memory.

11. The computer program product of claim 8, wherein the program instructions are readable and/or executable by the processor to cause the processor to:
cause, by the processor, a sorting operation to be performed on the sheared records in the first target area of memory.

12. The computer program product of claim 8, wherein normalizing the sheared key includes:
attaching a stability index to the sheared key, wherein the stability index maintains a relative order of the payload data in the respective record with respect to other payload data in the second target area of memory.

13. The computer program product of claim 8, wherein normalizing the sheared key includes:
determining whether a type of information in the key, associated with the respective record, is supported;
in response to determining that the type of information in the key, associated with the respective record, is not supported, determining whether the information in the key, associated with the respective record, is properly aligned; and
in response to determining that the information in the key, associated with the respective record, is not properly aligned, normalizing the sheared key.

14. The computer program product of claim 8, wherein the program instructions are readable and/or executable by the processor to cause the processor to:
- process, by the processor, the records in the input data buffer by performing the following operations on each of the respective records:
  - determine, by the processor, whether the respective record is a variable length record; and
  - in response to determining that the respective record is a variable length record:
    - store, by the processor, the payload data in the second target area of memory, and
    - append, by the processor, the data locator to the normalized sheared key in the first target area of memory to form the sheared record.

15. A system, comprising:
- a processor; and
- logic integrated with the processor, executable by the processor, or integrated with and executable by the processor, the logic being configured to:
- store, by the processor, records in an input data buffer, wherein each respective record of the records, includes a key which is appended to payload data in the respective record; and
- process, by the processor, the records in the input data buffer by performing the following operations on each of the respective records:
  - shear, by the processor, the key associated with the respective record from the payload data in the respective record,
  - normalize, by the processor, the sheared key,
  - store, by the processor, the normalized sheared key in a first target area of memory,
  - in response to determining that the respective record is not a variable length record, determine, by the processor, whether a size of the payload data in the respective record is outside a predetermine range,
  - in response to determining that the size of the payload data in the respective record is outside the predetermine range, store, by the processor, the payload data in a second target area of memory, and
  - append, by the processor, a data locator to the normalized sheared key, in the first target area of memory, to form a sheared record, wherein the data locator corresponds to a storage location of the payload data in the second target area of memory.

16. The system of claim 15, wherein the logic is configured to:
- process, by the processor, the records in the input data buffer by performing the following operations on each of the respective records:
  - in response to determining that the size of the payload data in the respective record is not outside the predetermine range, combine, by the processor, the normalized sheared key with the payload data to form an appended record, and
  - store, by the processor, the appended record in the first target area of memory.

17. The system of claim 16, wherein the logic is configured to:
- cause, by the processor, a sorting operation to be performed on the appended records in the first target area of memory.

18. The system of claim 15, wherein the logic is configured to:
- cause, by the processor, a sorting operation to be performed on the sheared records in the first target area of memory.

19. The system of claim 15, wherein normalizing the sheared key includes:
- attaching a stability index to the sheared key, wherein the stability index maintains a relative order of the payload data in the respective record with respect to other payload data in the second target area of memory.

20. The system of claim 15, wherein the logic is configured to:
- process, by the processor, the records in the input data buffer by performing the following operations on each of the respective records:
  - determine, by the processor, whether the respective record is a variable length record; and
  - in response to determining that the respective record is a variable length record:
    - store, by the processor, the payload data in the second target area of memory, and
    - append, by the processor, the data locator to the normalized sheared key in the first target area of memory to form the sheared record.

* * * * *